United States Patent
Kobayashi

(10) Patent No.: US 8,259,226 B2
(45) Date of Patent: Sep. 4, 2012

(54) IMAGE DISPLAY DEVICE

(75) Inventor: Masamitsu Kobayashi, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 742 days.

(21) Appl. No.: 12/310,104

(22) PCT Filed: Jun. 15, 2007

(86) PCT No.: PCT/JP2007/062089
§ 371 (c)(1),
(2), (4) Date: Feb. 11, 2009

(87) PCT Pub. No.: WO2008/062578
PCT Pub. Date: May 29, 2008

(65) Prior Publication Data
US 2010/0002132 A1    Jan. 7, 2010

(30) Foreign Application Priority Data

Nov. 24, 2006 (JP) .................... 2006-317058

(51) Int. Cl.
*H04N 7/01* (2006.01)
*H04N 11/20* (2006.01)

(52) U.S. Cl. ........ 348/441; 348/458; 348/459; 348/452; 348/739; 375/240.16; 375/240.17; 375/240.29

(58) Field of Classification Search .................. 348/441, 348/458, 459, 452, 739; 375/240.16, 240.17, 375/240.29
See application file for complete search history.

(56) References Cited

U.S. PATENT DOCUMENTS

| 5,708,474 | A  | * | 1/1998  | Hong .............................. | 348/448 |
| 6,462,728 | B1 | * | 10/2002 | Janssen et al. ................ | 345/100 |
| 6,900,846 | B2 | * | 5/2005  | Lee et al. ....................... | 348/459 |
| 6,930,752 | B2 | * | 8/2005  | Baba et al. ....................... | 352/38  |
| 7,310,118 | B2 | * | 12/2007 | Kamimura .................... | 348/441 |
| 8,154,654 | B2 | * | 4/2012  | Tokutomi et al. ............. | 348/448 |
| 2002/0015104 | A1 |   | 2/2002 | Itoh et al. | |
| 2002/0084959 | A1 | * | 7/2002 | Park et al. ....................... | 345/87 |

(Continued)

FOREIGN PATENT DOCUMENTS

JP    01-192273    8/1989

(Continued)

OTHER PUBLICATIONS

Technical Report of IEICE,. EID96-4 (Jun. 1996) US Abstract Attached, vol. 96, No. 87, pp. 19-26.

*Primary Examiner* — Jefferey Harold
*Assistant Examiner* — Mustafizur Rahman
(74) *Attorney, Agent, or Firm* — Harness, Dickey & Pierce

(57) ABSTRACT

In one embodiment of the present application, a frame interpolation circuit performs frame interpolation on an input video signal, and outputs a drive video signal containing original and interpolation frames. A motion determination circuit outputs a control signal in accordance with the amount of motion, based on a motion vector obtained by a motion detection circuit. In accordance with the control signal, the frame interpolation circuit increases the proportion of interpolation frames contained in the drive video signal as motion in an image increases, while increasing the proportion of original frames contained in the drive video signal as the motion in the image decreases. As a result, any moving image blur due to following line of sight and noise generated in the interpolation frames are reduced.

11 Claims, 13 Drawing Sheets

U.S. PATENT DOCUMENTS

| | | | |
|---|---|---|---|
| 2004/0046891 A1* | 3/2004 | Mishima et al. | 348/459 |
| 2005/0068424 A1* | 3/2005 | Kaneko et al. | 348/222.1 |
| 2005/0078069 A1 | 4/2005 | Aiba et al. | |
| 2006/0092164 A1 | 5/2006 | Takeuchi et al. | |
| 2007/0132683 A1 | 6/2007 | Kong | |

FOREIGN PATENT DOCUMENTS

| | | |
|---|---|---|
| JP | 02-206991 | 8/1990 |
| JP | 03-263989 | 11/1991 |
| JP | 06-153185 | 5/1994 |
| JP | 2002-6818 | 1/2002 |
| JP | 2004-177576 | 6/2004 |
| JP | 2004-355017 | 12/2004 |
| JP | 2005-148521 | 6/2005 |
| JP | 2006-94261 | 4/2006 |
| JP | 2006-154751 | 6/2006 |
| JP | 2007-156412 | 6/2007 |

\* cited by examiner

|  | PROPORTION OF CORRECT FRAMES (%) | BLUR WIDTH (PIXEL) | PROPORTION TO MAXIMUM BLUR WIDTH (%) |
|---|---|---|---|
| 4 INTERPOLATION FRAMES | 20 | 1.6 | 40 |
| 3 INTERPOLATION FRAMES | 40 | 1.75 | 43.8 |
| 2 INTERPOLATION FRAMES | 60 | 2.0 | 50 |
| 1 INTERPOLATION FRAME | 80 | 3.0 | 75 |
| 0 INTERPOLATION FRAME | 100 | 4.0 | 100 |
| WITHOUT FRAME INTERPOLATION | (100) | 4.0 (=MAXIMUM BLUR WIDTH) | (100) |

# IMAGE DISPLAY DEVICE

TECHNICAL FIELD

The present invention relates to image display devices, such as liquid crystal display devices and electroluminescence display devices.

BACKGROUND ART

Recent years have seen some remarkable progress in liquid crystal technology, as well as progress in improvements to angle of visibility, responsiveness, etc., which long had been identified as problems to be solved. Correspondingly, applications of liquid crystal display devices also extend to large-sized televisions. However, even at the present time, when liquid crystal response characteristics have been improved, moving images displayed on liquid crystal televisions occasionally appear blurry.

Liquid crystal display devices do not provide self-light-emission displays, but provide non-self-light-emission displays by adjusting light transmittance of a liquid crystal panel through voltage. In liquid crystal display devices, video data for one frame is written onto each pixel of the liquid crystal panel, and the pixel holds voltage for video data written earlier until video data for the next frame is written. This allows liquid crystal display devices to provide a hold-mode display in which video is held over one frame period. It is generally known that a blurry moving image (hereinafter, referred to as a "moving image blur") appears on a display device for providing a hold-mode display due to the viewer's following line of sight. Liquid crystal display devices have so far been disadvantageous in terms of image tailing due to a slow liquid crystal response speed (one frame period or more is taken). However, in recent years, the liquid crystal response speed has been improved to be within one frame period, and correspondingly, any moving image blur caused by providing a hold-mode display is acknowledged as an issue.

In CRTs, unlike in liquid crystal display devices, each pixel is irradiated with a beam for a certain time period within one frame period, and emits light while being irradiated with the beam. This allows CRTs to provide an impulse display in which each pixel emits light for a short time period within one frame period. In display devices for providing an impulse display, after emitting light once, pixels do not emit light until the next frame period, and therefore any moving image blur appears due to following line of sight (but, tailing might occur due to afterglow).

Therefore, a conceivable method for alleviating any moving image blur on liquid crystal display devices is to provide a pseudo-impulse display in liquid crystal display devices as in CRTs. Concretely, known methods are to cause a backlight to blink for a time period within one frame period or to provide a black display for a time period within one frame period. In addition, another known method for alleviating any moving image blur is to provide an increased display frequency by frame interpolation (Non-Patent Document 1).

Among the above, the methods that provide a pseudo-impulse display (the backlight blinking method and the black display method) have a problem where brightness and contrast of the liquid crystal panel might decrease, resulting in flickers by impulse display as in CRTs. Accordingly, it might be said that the frame interpolation method free from such a problem is superior as a method for alleviating any moving image blur.

As for frame interpolation, the following techniques are known. Patent Documents 1 and 2 disclose methods in which one frame is divided into a plurality of blocks, a block-by-block matching process is performed to obtain a motion vector, and the blocks are moved by an amount equivalent to ½ times the obtained motion vector, thereby generating an interpolation frame. Patent Documents 3 and 4 disclose methods in which motion vectors are obtained for a plurality of block sizes, and an optimum motion vector is selected from among them. Patent Document 5 discloses a method in which frame interpolation is used to perform frame rate conversion at various rates.

[Patent Document 1] Japanese Laid-Open Patent Publication No. 3-263989
[Patent Document 2] Japanese Laid-Open Patent Publication No. 2-206991
[Patent Document 3] Japanese Laid-Open Patent Publication No. 1-192273
[Patent Document 4] Japanese Laid-Open Patent Publication No. 6-153185
[Patent Document 5] Japanese Laid-Open Patent Publication No. 2005-148521
[Non-Patent Document 1] Ishiguro and Kurita, "Consideration on Motion Picture Quality of the Hold Type Display with an octuple-rate CRT", the Technical Report of the Proceeding of the Institute of Electronics, Information and Communication Engineers, EID 96-4, Jun. 7, 1996, Vol. 96, No. 87, pp. 19-26

DISCLOSURE OF THE INVENTION

Problems to be Solved by the Invention

However, the above methods have the following problems. In the methods disclosed in Patent Documents 1 and 2, the interpolation frame is created by moving an image block by block. Accordingly, not only a moving image portion but also a still portion (background portion) move, producing noise in the interpolation frame. The methods disclosed in Patent Documents 3 and 4 can solve this noise problem, but require a large-scale circuit to detect motion vectors for a plurality of block sizes in real-time. Also, in the method disclosed in Patent Document 5, as the rate for frame rate conversion changes and the number of interpolation frames used increases, there is an increased possibility of causing image deterioration with noise generated in the interpolation frames.

Therefore, an objective of the present invention is to provide an image display device with reduced moving image blur due to following line of sight, as well as reduced noise generated in interpolation frames.

Solution to the Problems

A first aspect of the present invention is directed to an image display device for displaying a screen based on a video signal subjected to frame interpolation, comprising: a plurality of display elements; a drive circuit for driving the display elements; a frame interpolation circuit for performing frame interpolation on an input video signal, and outputting a drive video signal containing original and interpolation frames to the drive circuit; and a motion determination circuit for outputting a control signal in accordance with an amount of motion, based on a motion detection result for the input video signal, wherein, the frame interpolation circuit changes the proportion between the original and interpolation frames contained in the drive video signal in accordance with the control signal.

In a second aspect of the present invention, based on the first aspect of the invention, the frame interpolation circuit increases the proportion of interpolation frames contained in the drive video signal as motion in an image represented by the input video signal increases, while increasing the proportion of original frames contained in the drive video signal as the motion in the image represented by the input video signal decreases.

In a third aspect of the present invention, based on the first aspect of the invention, the frame interpolation circuit performs frame interpolation on the input video signal based on the motion detection result for the input video signal.

In a fourth aspect of the present invention, based on the third aspect of the invention, the frame interpolation circuit obtains the interpolation frame based on the motion detection result for the input video signal using at least either a motion-compensated image for a previous frame or a motion-compensated image for a subsequent frame.

In a fifth aspect of the present invention, based on the first aspect of the invention, a motion detection circuit for performing motion detection on the input video signal is further comprised.

In a sixth aspect of the present invention, based on the fifth aspect of the invention, the motion detection circuit performs motion detection on the input video signal through a block-by-block matching process.

In a seventh aspect of the present invention, based on the fifth aspect of the invention, the motion detection circuit performs motion detection on the input video signal through a pixel-by-pixel matching process.

In an eighth aspect of the present invention, based on the first aspect of the invention, the drive circuit subjects the drive video signal to gradation conversion for redistributing brightness in accordance with a predetermined priority order among a plurality of frames, and uses a resultant video signal to drive the display elements.

In a ninth aspect of the present invention, based on the eighth aspect of the invention, the drive circuit alternately subjects the drive video signal on a frame-by-frame basis to first gradation conversion for non-preferential brightness distribution and second gradation conversion for preferential brightness distribution, and uses a resultant video signal to drive the display elements.

In a tenth aspect of the present invention, based on the eighth aspect of the invention, of the original and interpolation frames, the frame interpolation circuit preferentially assigns the original frame to any frame to which brightness is preferentially distributed by the drive circuit.

In an eleventh aspect of the present invention, based on the first aspect of the invention, the drive video signal has a frame rate greater than the frame rate of the input video signal.

EFFECT OF THE INVENTION

According to the first aspect of the present invention, when displaying a screen based on a video signal subjected to frame interpolation, it is possible to display a larger number of original or interpolation frames in accordance with the amount of motion in an image. By displaying a larger number of original frames, it is possible to reduce noise generated in the interpolation frames, whereas by displaying a larger number of interpolation frames, it is possible to reduce any moving image blur due to following line of sight. Accordingly, it is possible to display the original and interpolation frames in a proportion suitable for the amount of motion in the image, thereby reducing any moving image blur due to following line of sight and noise generated in the interpolation frames.

According to the second aspect of the present invention, by displaying a larger number of interpolation frames as the motion in the image increases, while displaying a larger number of original frames as the motion in the image decreases, it becomes possible to reduce any moving image blur due to following line of sight and noise generated in the interpolation frames.

According to the third aspect of the present invention, it is possible to obtain the interpolation frames based on a detection result for an input video signal and display the original and interpolation frames in a proportion suitable for the amount of motion in the image, thereby reducing any moving image blur due to following line of sight and noise generated in the interpolation frames.

According to the fourth aspect of the present invention, it is possible to obtain the interpolation frames using a motion-compensated image for a previous frame, a motion-compensated image for a subsequent frame, or both.

According to the fifth aspect of the present invention, it is possible to obtain the amount of motion in an image inside the image display device, and display the original and interpolation frames in a proportion suitable for the obtained amount of motion, thereby reducing any moving image blur due to following line of sight and noise generated in the interpolation frames.

According to the sixth aspect of the present invention, by performing the block-by-block matching process on an input video signal, it is possible to obtain a motion vector as a motion detection result for each block.

According to the seventh aspect of the present invention, by performing the pixel-by-pixel matching process on an input video signal, it is possible to obtain a motion vector as a motion detection result for each pixel.

According to the eighth aspect of the present invention, even when performing time-division gradation drive for preferentially redistributing brightness in accordance with a predetermined priority order among a plurality of frames, it is possible to display the original and interpolation frames in a proportion suitable for the amount of motion in the image, thereby reducing any moving image blur due to following line of sight and noise generated in the interpolation frames.

According to the ninth aspect of the present invention, even when performing time-division gradation drive for preferentially redistributing brightness to one of two frames, it is possible to display the original and interpolation frames in a proportion suitable for the amount of motion in the image, thereby reducing any moving image blur due to following line of sight and noise generated in the interpolation frames.

According to the tenth aspect of the present invention, by preferentially assigning the original frame to any frame to which brightness is preferentially distributed, it becomes possible to reduce noise generated in the frame to which brightness is preferentially distributed. As a result, in the image display device performing time-division gradation drive, it is possible to further reduce noise generated in the interpolation frames.

According to the eleventh aspect of the present invention, when the rate for frame rate conversion is greater than 1, it is possible to prevent noticeable noise from being generated in the interpolation frames.

Figure 1:
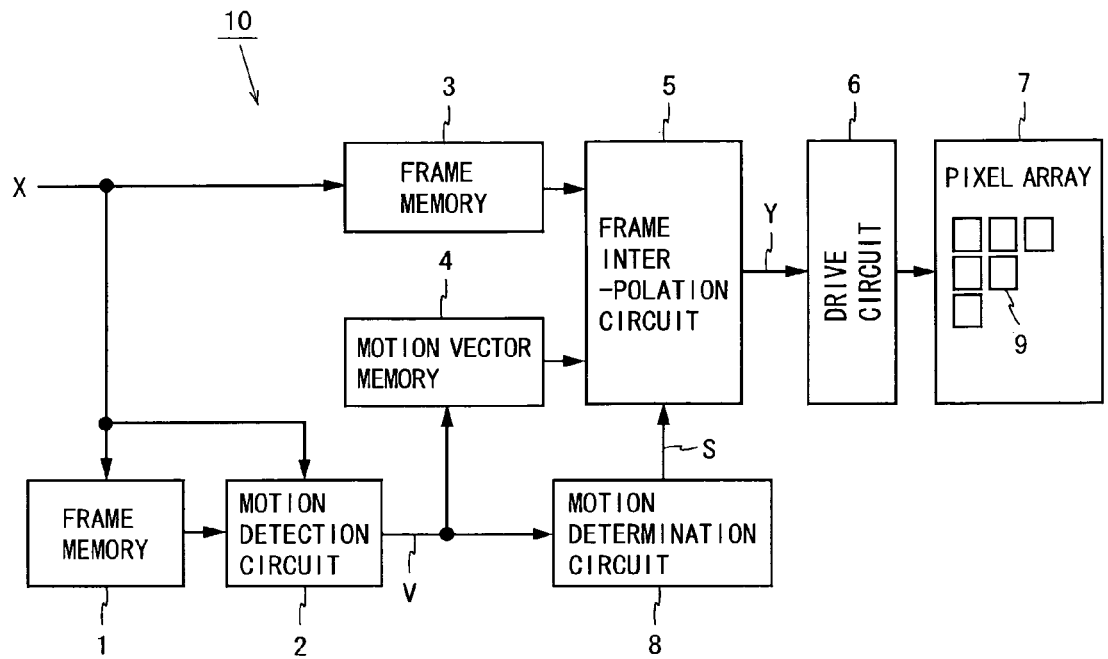
FIG. 1 is a block diagram illustrating the configuration of liquid crystal display devices according to first and second embodiments of the present invention.

DESCRIPTION OF THE REFERENCE CHARACTERS 1, 3 frame memory
2 motion detection circuit
4 motion vector memory
5 frame interpolation circuit
6 drive circuit
7 pixel array
8 motion determination circuit
9 liquid crystal display element
10 liquid crystal display device

BEST MODE FOR CARRYING OUT THE INVENTION (First Embodiment)

FIG. 1 is a block diagram illustrating the configuration of a liquid crystal display device according to a first embodiment of the present invention. The liquid crystal display device 10 shown in FIG. 1 includes a motion detection frame memory 1, a motion detection circuit 2, a frame interpolation frame memory 3, a motion vector memory 4, a frame interpolation circuit 5, a drive circuit 6, a pixel array 7, and a motion determination circuit 8. The liquid crystal display device 10 performs 2.5-times higher speed frame interpolation on an input video signal X, and displays a screen based on a resultant drive video signal Y.

The liquid crystal display device 10 is supplied with an input video signal X having a frame rate of 60 Hz. The input video signal X is written onto the frame memory 1, and outputted from the frame memory 1 with a delay of one frame period. The motion detection circuit 2 performs motion detection using the input video signal X as a current frame video signal and the video signal outputted from the frame memory 1 as a previous frame video signal, and outputs a motion vector V as a motion detection result. The motion detection circuit 2 may obtain the motion vector V, for example, through a block-by-block matching process, a pixel-by-pixel matching process, or any other method.

The input video signal X and the motion-vector V are written onto the frame memory 3 and the motion vector memory 4, respectively. The frame interpolation circuit 5 reads a video signal and a motion vector that are required, from the frame memory 3 and the motion vector memory 4, performs 2.5-times higher speed frame interpolation on the video signal being read, based on the motion vector being read, and outputs a drive video signal Y having a frame rate of 150 Hz. The frame interpolation circuit 5 will be described in detail later.

The pixel array 7 includes a plurality of liquid crystal display elements 9, which are arranged two-dimensionally. The drive circuit 6 drives the liquid crystal display elements 9 based on the drive video signal Y outputted from the frame interpolation circuit 5. As a result, the liquid crystal display device 10 displays a screen.

The motion determination circuit 8 outputs a control signal S in accordance with the amount of motion in an image represented by the video signal X, based on the motion vector V obtained in the motion detection circuit 2. In the present embodiment, the control signal S takes any of five values from 0 to 4, and the value of the control signal S increases with the motion of the image.

Hereinafter, the frame interpolation circuit 5 will be described in detail. As described above, the frame interpolation circuit 5 performs 2.5-times higher speed frame interpolation on the input video signal X (with a frame rate of 60 Hz), and outputs the drive video signal Y (with a frame rate of 150 Hz). The drive video signal Y contains frames originally contained in the input video signal X (hereinafter, referred to as "original frames"), and frames created anew by the frame interpolation circuit 5 (hereinafter, referred to as "interpolation frames"). That is, the frame interpolation circuit 5 outputs the drive video signal Y containing the original and interpolation frames.

Figure 2:
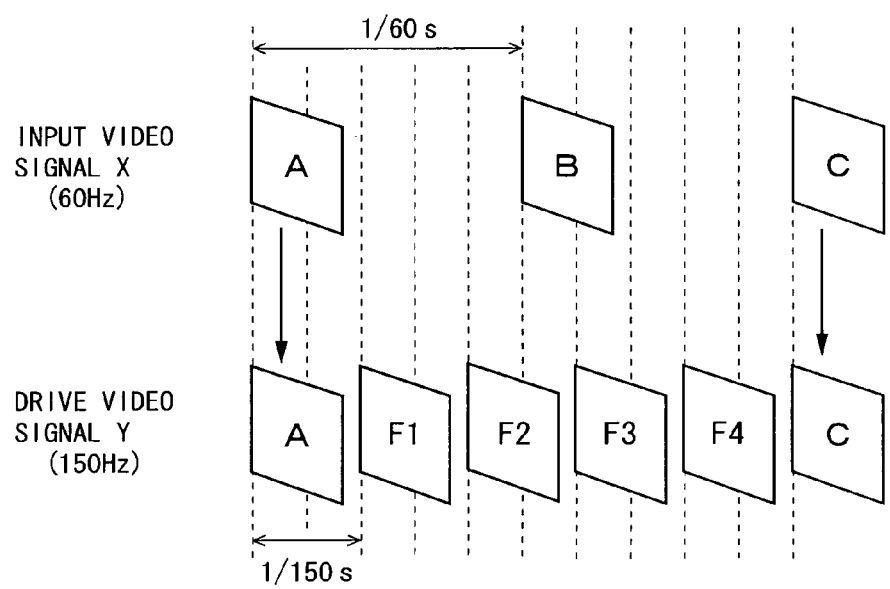
FIG. 2 is a diagram illustrating 2.5-times higher speed frame interpolation by the liquid crystal display device according to the first embodiment.
Figure 3A:
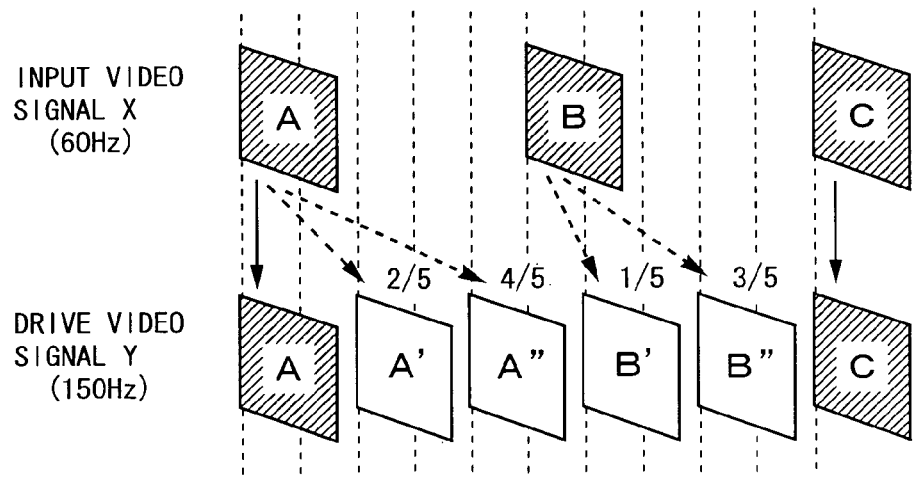
FIG. 3A is a diagram illustrating in detail the 2.5-times higher speed frame interpolation by the liquid crystal display device according to the first embodiment (in the case of four interpolation frames).
Figure 3B:
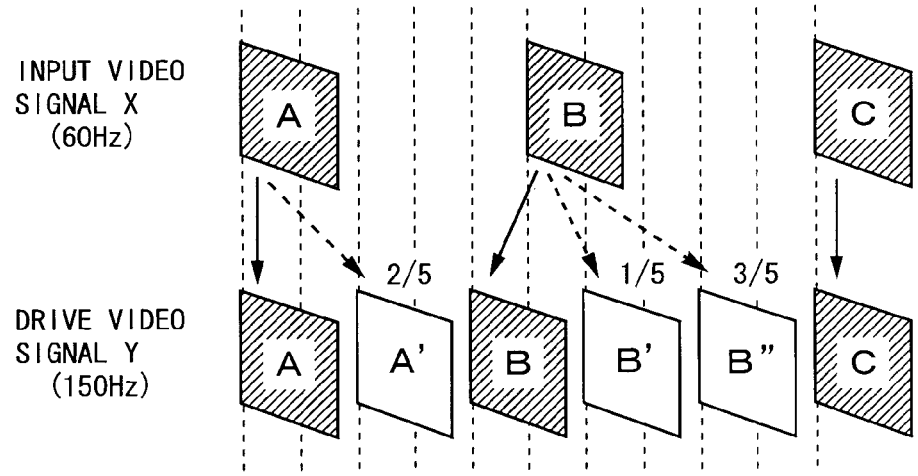
FIG. 3B is a diagram illustrating the same in the case of three interpolation frames.
Figure 3C:
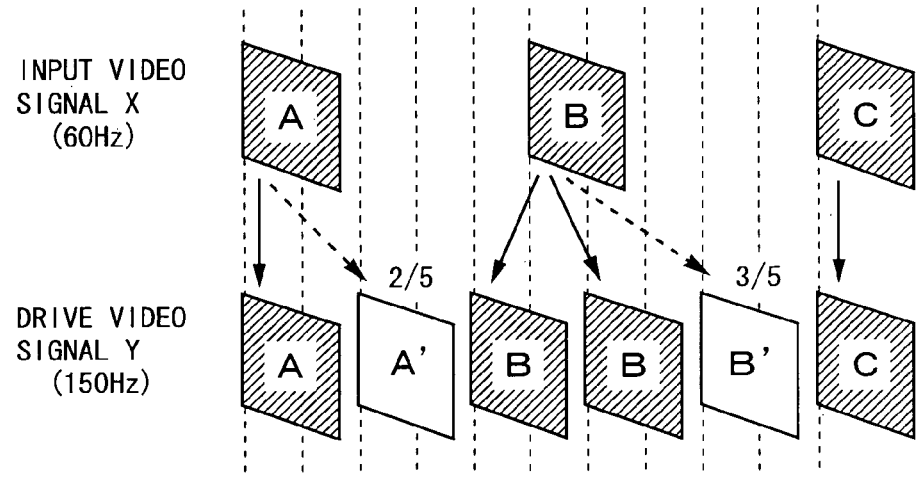
FIG. 3C is a diagram illustrating the same in the case of two interpolation frames.
Figure 3D:
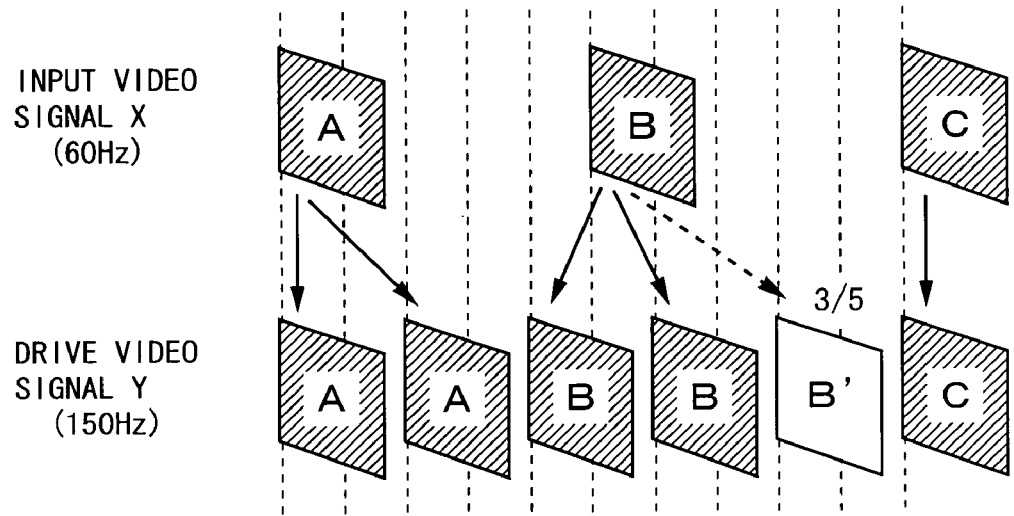
FIG. 3D is a diagram illustrating the same in the case of one interpolation frame.
Figure 3E:
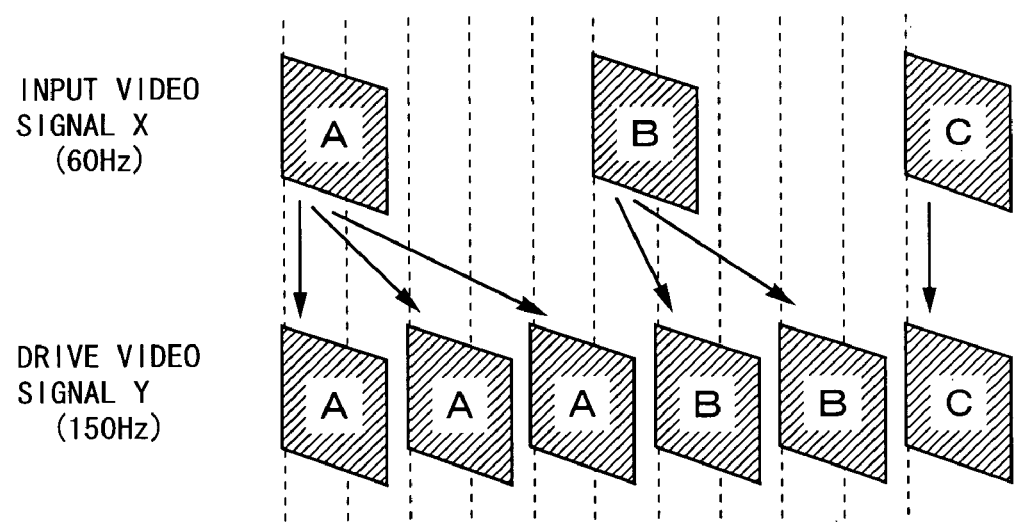
FIG. 3E is a diagram illustrating the same in the case of no interpolation frame.

FIG. 2 is a diagram illustrating 2.5-times higher speed frame interpolation by the frame interpolation circuit 5. In the 2.5-times higher speed frame interpolation, five frames are outputted per input of two frames. For example, as shown in FIG. 2, when frames A, B, and C are inputted at intervals of $1/60$ sec. to the liquid crystal display device 10, the frame interpolation circuit 5 outputs the frames A and C without modification, while outputting four frames F1 to F4 at intervals of $1/150$ sec. between the frames A and C.

The frame interpolation circuit 5 outputs either original or interpolation frames as the frames F1 to F4. More specifically, the frame interpolation circuit 5 selectively outputs either original or interpolation frames as the frames F1 to F4 in accordance with the control signal S outputted from the motion determination circuit 8. When the control signal S has a value of "s" (where "s" is an integer from 0 to 4), the frame interpolation circuit 5 outputs "s" interpolation frames and "(4-s)" original frames as the frames F1 to F4.

The interpolation frame is created based on an immediately previous original frame (hereinafter, referred to as a "previous frame") and an immediately subsequent original frame (hereinafter, referred to as a "subsequent frame"). More specifically, the frame interpolation circuit 5 creates the interpolation frame using at least either a motion-compensated image for the previous frame or a motion-compensated image for the subsequent frame, based on a motion vector between the previous frame and the subsequent frame. Note that the frame interpolation circuit 5 may create the interpolation frame as well by any method other than the above.

Described below is a case where the frame interpolation circuit 5 creates the interpolation frame using the motion-compensated image for the previous frame. Where there is a motion vector MV between a previous frame P and a subsequent frame Q, an image obtained by moving the previous frame P block-by-block by a distance of "a" times the motion vector MV (0<a<1), i.e., an interpolation frame obtained by motion compensation using a motion vector multiplied by "a" (a×MV) for the previous frame P, is denoted by $P_a$.

FIGS. 3A to 3E are diagrams each illustrating the details of 2.5-times higher speed frame interpolation by the frame interpolation circuit 5. The frame interpolation circuit 5 performs any of five operations shown in FIGS. 3A to 3E, in accordance with the control signal S. Note that in FIGS. 3A to 3E, hatched quadrangles represent frames contained in the input video signal X or original frames contained in the drive video signal Y, whereas non-hatched quadrangles represent interpolation frames contained in the video signal Y. The number "a" indicated above each interpolation frame represents that the interpolation frame was obtained by motion compensation using a motion vector multiplied by "a".

When the control signal S has a value of 4 (see FIG. 3A) the frame interpolation circuit 5 sequentially outputs $A_{2/5}$, $A_{4/5}$, $B_{1/5}$, and $B_{3/5}$ as the frames F1 to F4. In this case, the frame interpolation circuit 5 outputs four interpolation frames as the frames F1 to F4.

When the control signal S has a value of 3 (see FIG. 3B) the frame interpolation circuit 5 sequentially outputs $A_{2/5}$, B, $B_{1/5}$, and $B_{3/5}$ as the frames F1 to F4. In this case, the frame interpolation circuit 5 outputs three interpolation frames and one original frame as the frames F1 to F4.

When the control signal S has a value of 2 (see FIG. 3C) the frame interpolation circuit 5 sequentially outputs $A_{2/5}$, B, B, and $B_{3/5}$ as the frames F1 to F4. In this case, the frame interpolation circuit 5 outputs two interpolation frames and two original frames as the frames F1 to F4.

When the control signal S has a value of 1 (see FIG. 3D) the frame interpolation circuit 5 sequentially outputs A, B, B, and $B_{3/5}$ as the frames F1 to F4. In this case, the frame interpolation circuit 5 outputs three interpolation frames and one original frame as the frames F1 to F4.

When the control signal S has a value of 0 (see FIG. 3E), the frame interpolation circuit 5 sequentially outputs A, A, B, and B as the frames F1 to F4. In this case, the frame interpolation circuit 5 outputs four original frames as the frames F1 to F4.

Note that when the motion vector multiplied by "a" (a×MV) has a fraction part, the frame interpolation circuit 5 preferably performs an interpolation operation on four surrounding pixels, as in half-pel prediction defined by MPEG (moving picture experts group), thereby obtaining a motion compensation result for one pixel.

In this manner, the frame interpolation circuit 5 changes the proportion between the original and interpolation frames contained in the drive video signal Y in accordance with the control signal S. In particular, the frame interpolation circuit 5 increases the proportion of interpolation frames contained in the drive video signal Y as motion in the image represented by the input video signal X increases (as the value of the control signal S increases), while increasing the proportion of original frames contained in the drive video signal Y as the motion in the image represented by the input video signal X decreases (as the value of the control signal S decreases).

In this manner, in the frame interpolation circuit 5, by changing the proportion between the original and interpolation frames contained in the drive video signal Y, the liquid crystal display device 10 displays a larger number of original frames or interpolation frames in accordance with the amount of motion in the image. By displaying a larger number of original frames, it is possible to reduce noise generated in the interpolation frame. However, displaying a larger number of original frames results in increased image holding time, hence a wider moving image blur. As such, there is a trade-off relationship between the noise generated in the interpolation frame and the moving image blur width.

Figure 4:
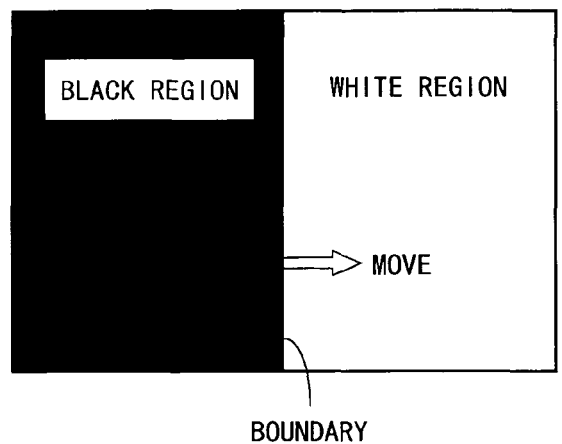
FIG. 4 is a diagram illustrating an exemplary display screen where a moving image blur occurs.

Here, an example is considered where black and white regions are displayed on a screen as shown in FIG. 4, with the boundary therebetween moving horizontally rightward at a rate of five pixels per frame (where one frame period is $1/60$ sec.). When seeing the screen shown in FIG. 4, the viewer moves his/her sight line along the moving direction of the boundary (rightward). Therefore, the viewer perceives as if a change in gradation shown in FIG. 5 occurs around the boundary.

Figure 5:
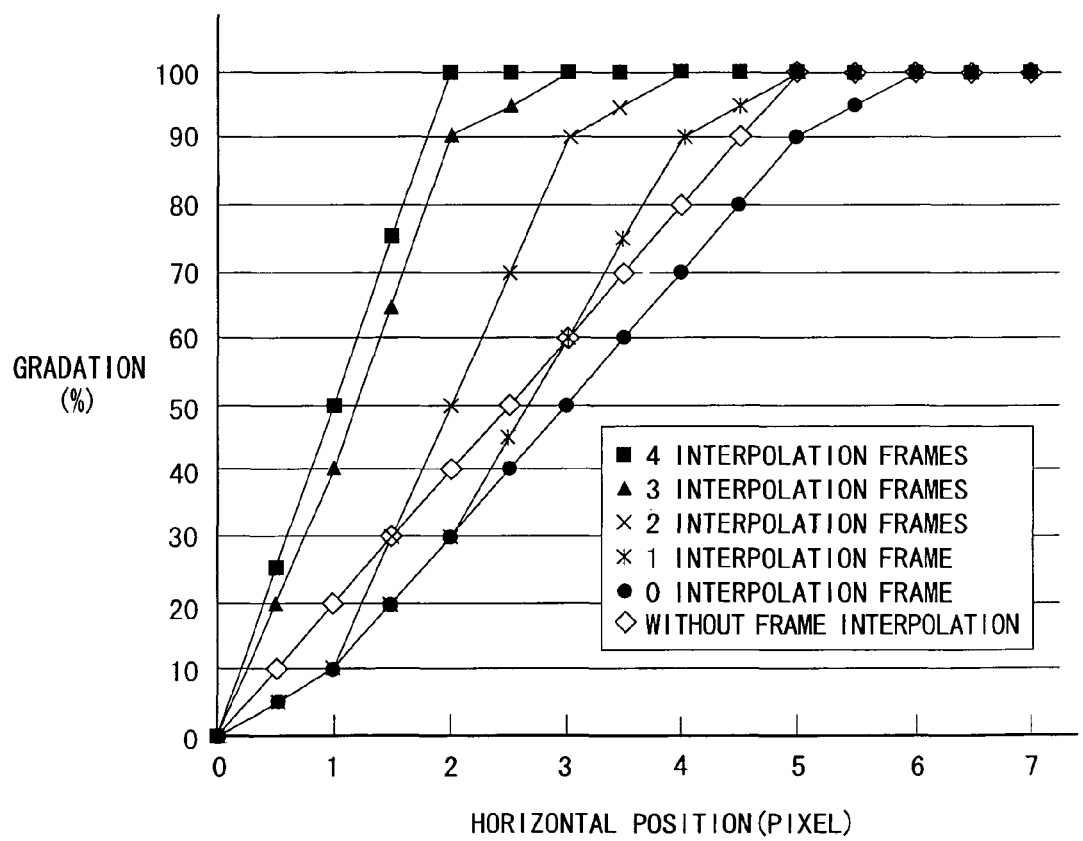
FIG. 5 is a graph showing gradation around a boundary observed by the viewer when the liquid crystal display device according to the first embodiment displays the screen shown in FIG. 4.

FIG. 5 is a graph showing the gradation around the boundary observed by the viewer for varying numbers of interpolation frames. In FIG. 5, the horizontal axis denotes the horizontal pixel position, and the vertical axis denotes the pixel gradation at each position. In FIG. 5, the gradation is 0% for the black region and 100% for the white region, and the horizontal position is 1 for the pixel at which the moving image blur first occurs (the leftmost pixel at which the moving image blur occurs). For example, when the control signal S has a value of 4, and four interpolation frames are outputted as the frames F1 to F4, the gradation of the pixel at horizontal position 1 is 50% (an exact middle gradation between the gradation of the black region and the gradation of the white region).

Figures 6, 7:
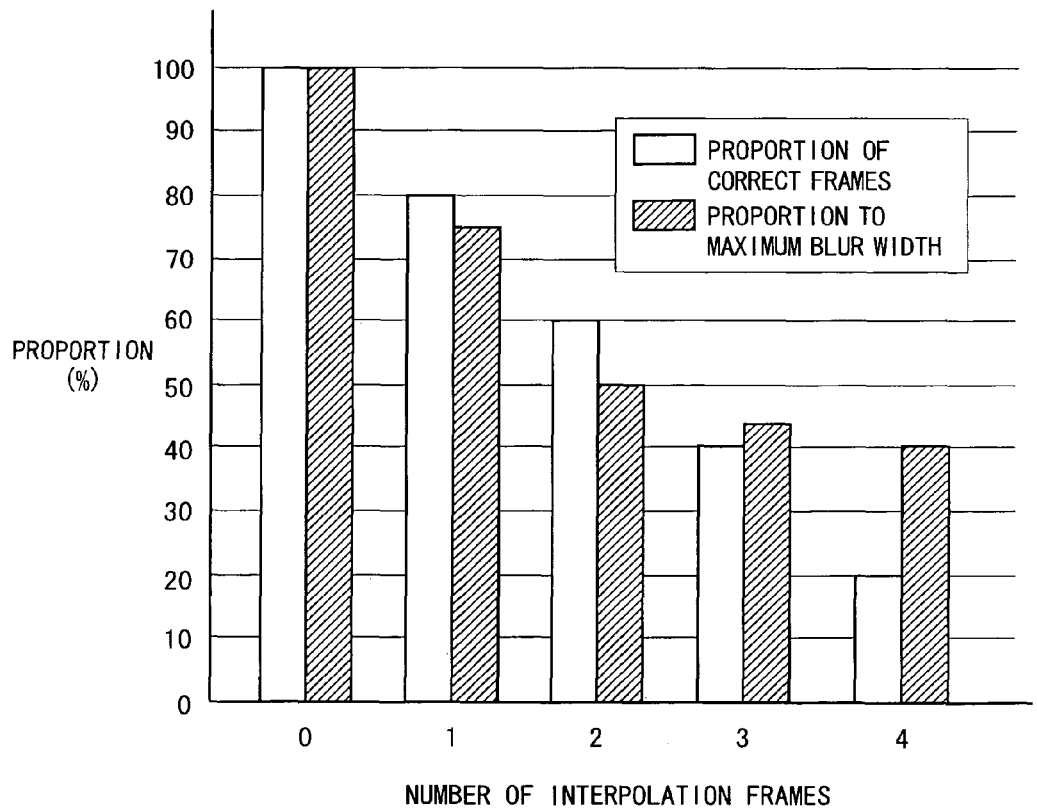
FIG. 6 is a table showing the proportion of correct frames, blur width, and the proportion to maximum blur width in the liquid crystal display device according to the first embodiment.
FIG. 7 is a diagram illustrating in the form of a graph the proportion of correct frames and the proportion to maximum blur width in the liquid crystal display device according to the first embodiment.

FIG. 6 is a table showing the proportion of correct frames, the width of a moving image blur (hereinafter, referred to as the "blur width"), and the proportion to maximum blur width, for varying numbers of interpolation frames. For example, when the control signal S has a value of 4, one original frame and four interpolation frames are outputted per input of two frames (see FIG. 3A), and therefore the proportion of correct frames (original frames) is 1/5=20%. Similarly, when the control signal S has a value of 3, 2, 1, or 0, the proportion of correct frames is 40%, 60%, 80%, or 100%, respectively.

The blur width shown in FIG. 6 can be obtained by subtracting the horizontal position with 10% gradation in FIG. 5 from the horizontal position with 90% gradation. For example, when the control signal S has a value of 4, the horizontal position with 90% gradation and the horizontal position with 10% gradation are at 1.8 and 0.2, respectively, and therefore the blur width is equivalent to 1.8−0.2=1.6 pixels. Similarly, when the control signal S has a value of 3, 2, 1, or 0, the blur width is equivalent to 1.75, 2.0, 3.0, or 4.0 pixels, respectively. Note that the reason to determine the blur width as described above is to take account of the EBET (extended blurred edge time) value, which is a moving image blur index close to a human sensation.

In addition, when providing a display using the input video signal X (with a frame rate of 60 Hz) without performing frame interpolation, the blur width is equivalent to 4.0 pixels. FIG. 6 also indicates the proportion to maximum blur width for this. For example, when the control signal S has a value of 4, the proportion to maximum blur width is 1.6/4.0=40%. Similarly, when the control signal S has a value of 3, 2, 1, or 0, the proportion to maximum blur width is 43.8%, 50%, 75%, or 100%, respectively.

The proportion of correct frames and the proportion to maximum blur width shown in FIG. 6 are represented, in the form of a graph as shown in FIG. 7. As shown in FIG. 7, as the number of interpolation frames increases, the proportion of correct frames decreases, and the proportion to maximum blur width decreases as well. However, the proportion of correct frames linearly decreases in accordance with the number of interpolation frames, whereas the rate of decrease in the proportion to maximum blur width falls as the number of interpolation frames increases.

Accordingly, by estimating noise to be generated in interpolation frames in accordance with the amount of motion in the image, and determining the number of interpolation frames, it becomes possible to minimize an increase in blur width, while suppressing occurrence of noise generated in the interpolation frames. Concretely, when the amount of motion in the image is large, the moving image blur due to following line of sight can be more problematic than the noise generated in the interpolation frames, and therefore it is preferable to display a larger number of interpolation frames. On the other hand, when the amount of motion in the image is small, the noise generated in the interpolation frames can be more problematic than the moving image blur due to following line of sight, and therefore it is preferable to display a larger number of original frames. The liquid crystal display device 10 displays a larger number of original or interpolation frames in accordance with the amount of motion in the image. Accordingly, the liquid crystal display device 10 makes it possible to display the original and interpolation frames in a proportion suitable for the amount of motion in the image, thereby reducing the moving image blur due to following line of sight and the noise generated in the interpolation frames.

Figure 8A:
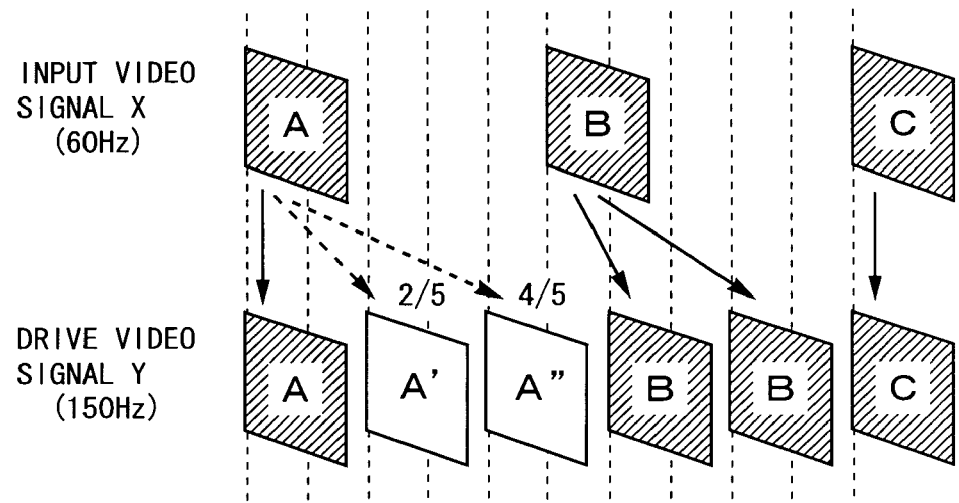
FIG. 8A is a diagram illustrating (the first example of) other exemplary 2.5-times higher speed frame interpolation by the liquid crystal display device according to the first embodiment.
Figure 8B:
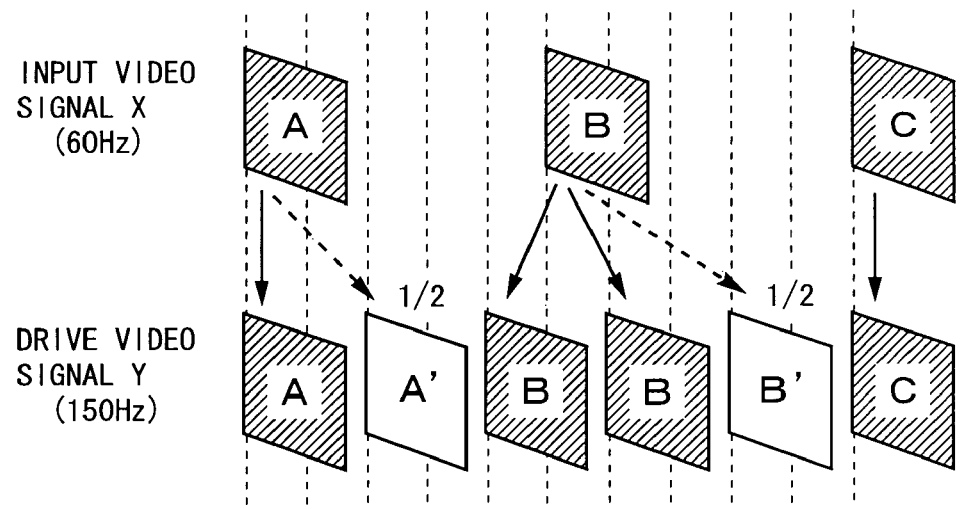
FIG. 8B is a diagram illustrating the second example of the same.

Note that the frame interpolation circuit 5 may also perform frame interpolation other than those shown in FIGS. 3A to 3E. FIGS. 8A and 8B are diagrams illustrating other examples of the 2.5-times higher speed frame interpolation by the frame interpolation circuit 5. For example, when the control signal S has a value of 2, the frame interpolation circuit 5 may sequentially output $A_{2/5}$, $A_{4/5}$, B, and B as the frames F1 to F4, as shown in FIG. 8A. Alternatively, when the control signal S has a value of 2, the frame interpolation circuit 5 may sequentially output $A_{1/2}$, B, B, and $B_{1/2}$ as the frames F1 to F4, as shown in FIG. 8B. In this manner, instead of using a motion vector multiplied by a rate (e.g., 2/5 or 4/5) in accordance with the timing of the frames contained in the input video signal X and the interpolation frames, a motion vector multiplied by a rate (e.g., 1/2) in accordance with the timing of the original and interpolation frames contained in the drive video signal Y may be used to create the interpolation frames.

Also, so long as the temporal order of the original and interpolation frames contained in the drive video signal Y is correct, the frame interpolation circuit 5 may output the interpolation frames at any times or may use a motion vector multiplied by an arbitrary number to create the interpolation frames. However, to effectively suppress occurrence of any moving image blur, when outputting the original frame in place of the interpolation frame, it is preferable to output the original frame at the closest possible times compared to the case of ideally outputting the interpolation frame.

Also, instead of using a motion-compensated image for the previous frame, the frame interpolation circuit 5 may use a motion-compensated image for the subsequent frame to create an interpolation frame. For example, the frame interpolation circuit 5 may output as the frame F1 an interpolation frame obtained by backward motion compensation using a motion vector multiplied by 3/5 for the frame B.

Alternatively, the frame interpolation circuit 5 may create an interpolation frame using the motion-compensated image for the previous frame and the motion-compensated image for the subsequent frame. In this case, the frame interpolation circuit 5 may synthesize the motion-compensated images for the previous and subsequent frames in accordance with a ratio of constants used to multiply the motion vector. For example, the frame interpolation circuit 5 may obtain the frame F1 by synthesizing images at a ratio of 3:2, one image being obtained by performing forward motion compensation using a motion vector multiplied by 2/5 for the frame A, the other image being obtained by performing backward motion compensation using a motion vector multiplied by 3/5 for the frame B.

As described above, the liquid crystal display device according to the present embodiment makes it possible, when displaying a screen based on a video signal subjected to frame interpolation, to display a larger number of original or interpolation frames in accordance with the amount of motion in the image. By displaying a larger number of original frames, it is possible to reduce noise generated in the interpolation frames, whereas by displaying a larger number of interpolation frames, it is possible to reduce the moving image blur due to following line of sight. Accordingly, it is possible to display the original and interpolation frames in a proportion suitable for the amount of motion in the image, thereby reducing any moving image blur due to following line of sight and noise generated in the interpolation frames. In particular, when the rate for frame rate conversion is greater than 1, it is possible to prevent noticeable noise from being generated in the interpolation frames.

(Second Embodiment)

A liquid crystal display device according to a second embodiment of the present invention has the same configuration as the liquid crystal display device according to the first embodiment (FIG. 1). However, in the present embodiment, the frame interpolation circuit 5, the drive circuit 6, and the motion determination circuit 8 operate in a different manner from those in the first embodiment. Hereinafter, the difference between the present embodiment and the first embodiment will be described, and any description of the common features between them will be omitted.

In the liquid crystal display device according to the present embodiment, the drive circuit 6 subjects a drive video signal Y outputted from the frame interpolation circuit 5 to gradation conversion for redistributing brightness in accordance with a predetermined priority order among a plurality of frames, and uses a resultant video signal to drive the liquid crystal display elements 9 (this method is referred to as "time-division gradation drive"). More specifically, the drive circuit 6 alternately subjects the drive video signal Y on a frame-by-frame basis to first gradation conversion for non-preferential brightness distribution and second gradation conversion for preferential brightness distribution, and uses a resultant video signal to drive the liquid crystal display elements 9. Hereinafter, frames contained in the drive video signal Y are alternately referred to as "first sub-frame" and "second sub-frame". The drive circuit 6 performs the first gradation conversion on the first sub-frame contained in the drive video signal Y, while performing the second gradation conversion on the second sub-frame contained in the drive video signal Y.

Figure 9:
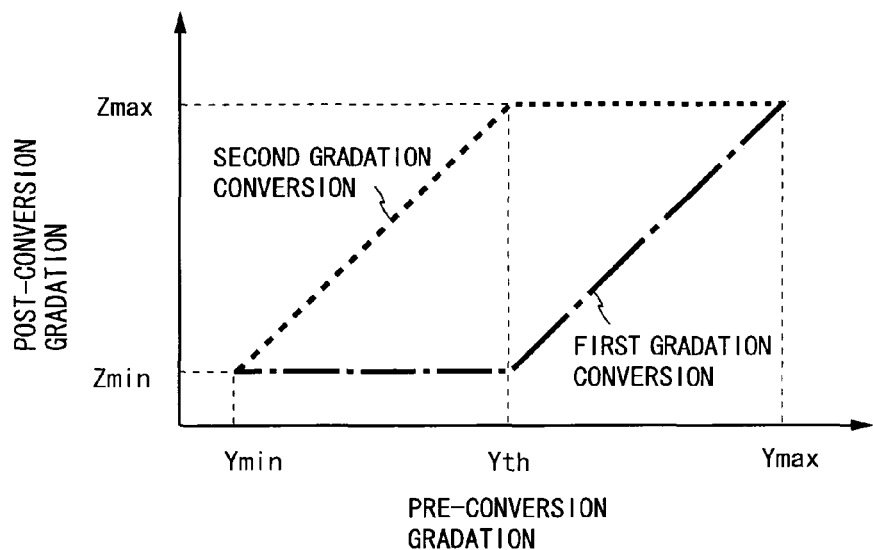
FIG. 9 is a graph illustrating characteristics of gradation conversion by a drive circuit of the liquid crystal display device according to the second embodiment.

FIG. 9 is a graph illustrating characteristics of the gradation conversion by the drive circuit 6. In FIG. 9, the horizontal axis denotes pre-conversion gradation, and the vertical axis denotes post-conversion gradation. In FIG. 9, the post-conversion gradation is indicated by the dashed line for the first gradation conversion performed on the first sub-frame and by the broken line for the second gradation conversion performed on the second sub-frame. As shown in FIG. 9, in the first gradation conversion, gradation less than a threshold Yth is converted to predetermined minimum gradation Zmin, whereas gradation equal to or greater than the threshold Yth is converted to gradation corresponding to the difference between that gradation and the threshold Yth. In the second gradation conversion, gradation equal to or greater than the threshold Yth is converted to predetermined maximum gradation Zmax, whereas gradation less than the threshold Yth is converted to gradation corresponding to that gradation.

The characteristics shown in FIG. 9 are determined such that the sum of time integration values for brightness of the first and second sub-frames reproduces brightness within a combined time period of the first and second sub-frames. Also, the characteristics shown in FIG. 9 are merely illustrative, and the drive circuit 6 may also perform gradation conversion other than those shown in FIG. 9.

The motion determination circuit 8 outputs a control signal S in accordance with the amount of motion in the image represented by the video signal X, based on the motion vector V obtained by the motion detection circuit 2. In the present embodiment, the control signal S takes any of nine values from 0 to 8, and the value of the control signal S increases with motion in the image.

Figure 10:
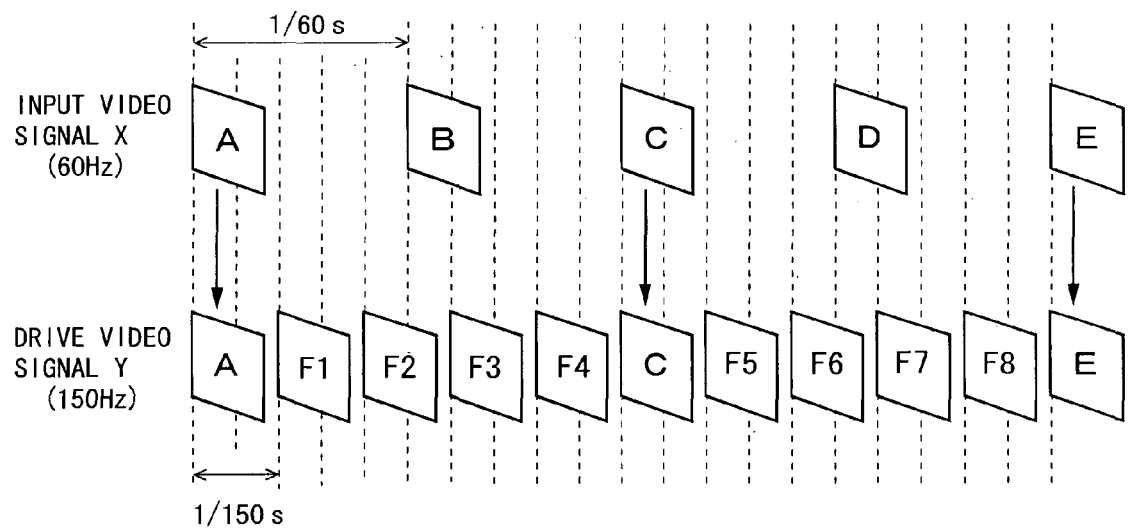
FIG. 10 is a diagram illustrating 2.5-times higher speed frame interpolation by the liquid crystal display device according to the second embodiment.
Figure 11A:
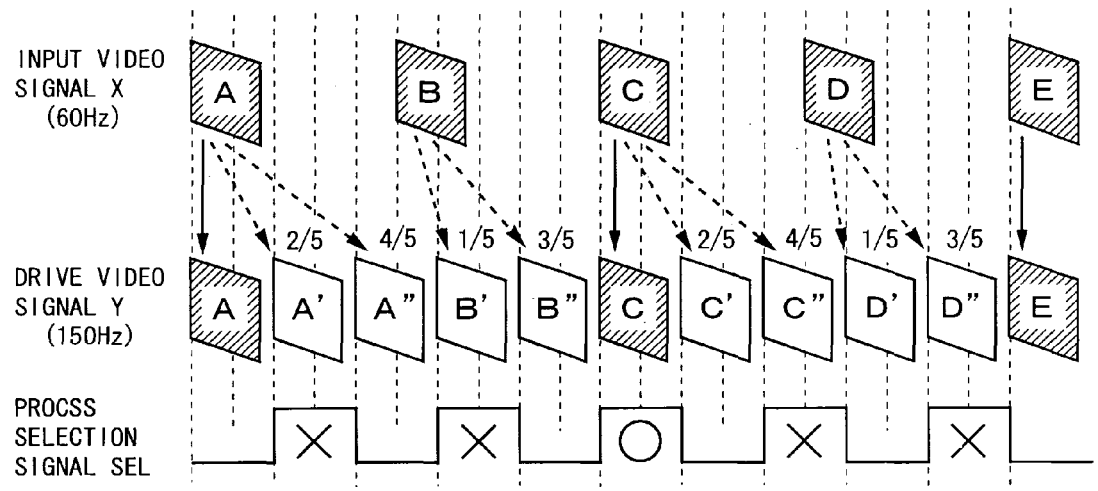
FIG. 11A is a diagram illustrating in detail the 2.5-times higher speed frame interpolation by the liquid crystal display device according to the second embodiment (in the case of eight interpolation frames).
Figure 11B:
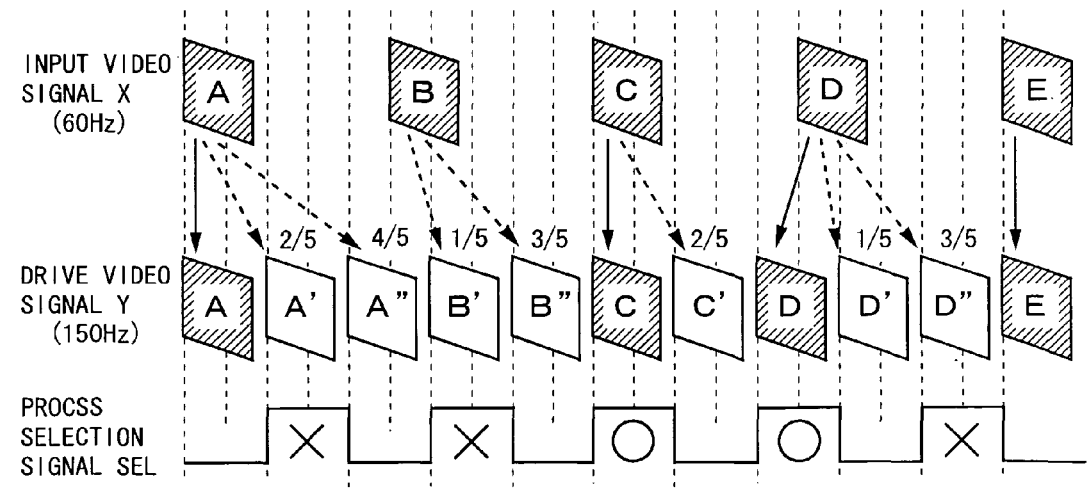
FIG. 11B is a diagram illustrating the same in the case of seven interpolation frames.
Figure 11C:
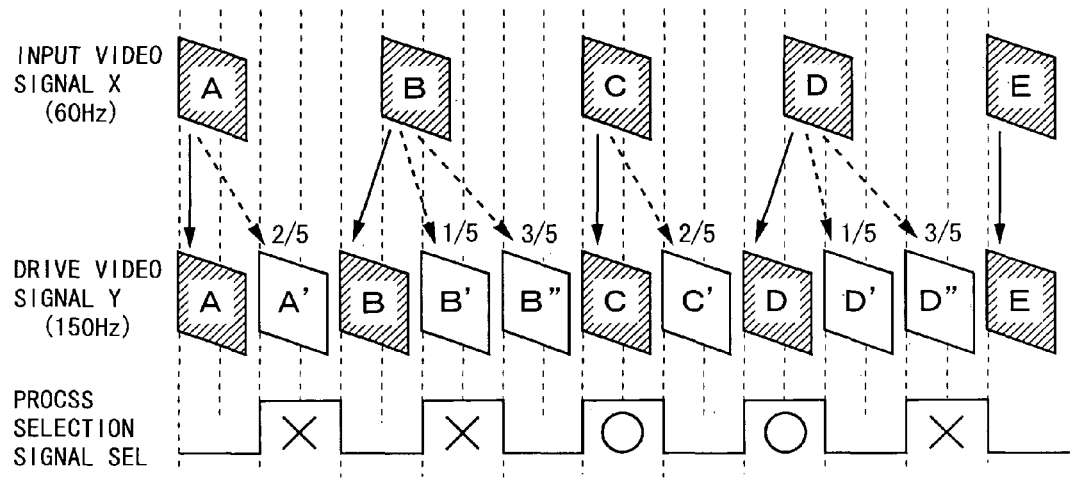
FIG. 11C is a diagram illustrating the same in the case of six interpolation frames.
Figure 11D:
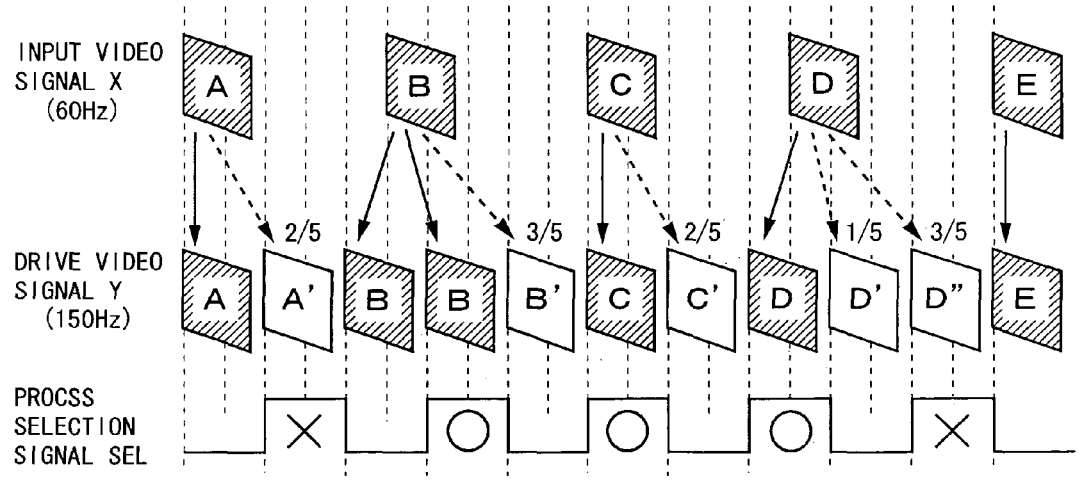
FIG. 11D is a diagram illustrating the same in the case of five interpolation frames.
Figure 11E:
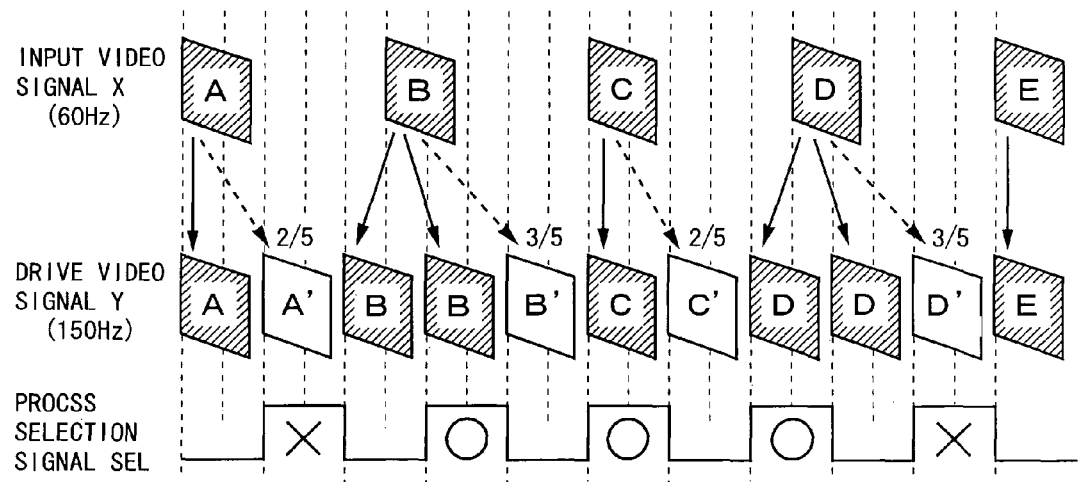
FIG. 11E is a diagram illustrating the same in the case of four interpolation frames.
Figure 11F:
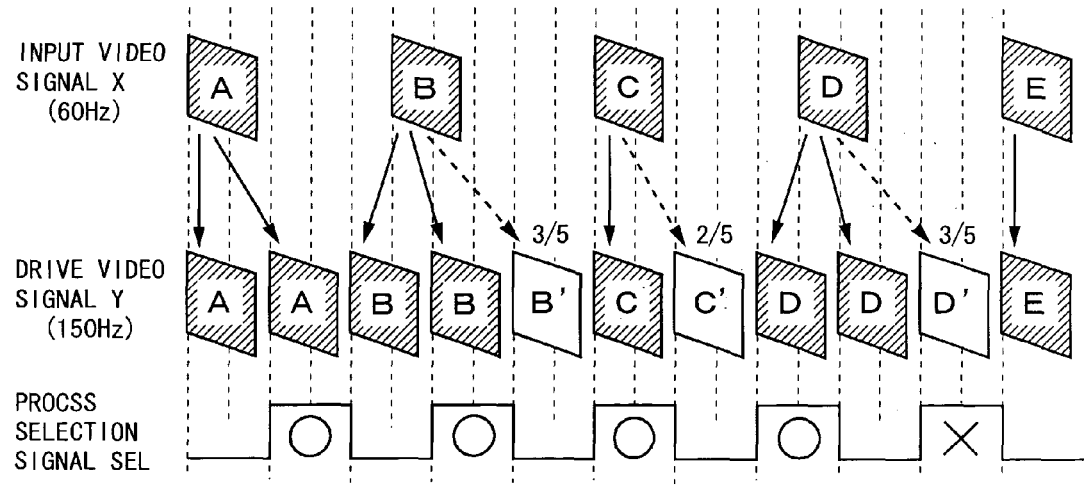
FIG. 11F is a diagram illustrating the same in the case of three interpolation frames.
Figure 11G:
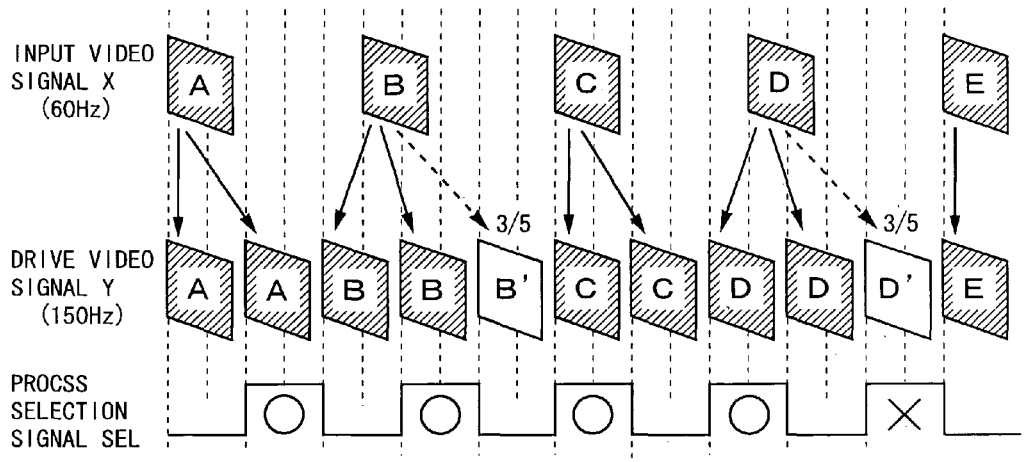
FIG. 11G is a diagram illustrating the same in the case of two interpolation frames.
Figure 11H:
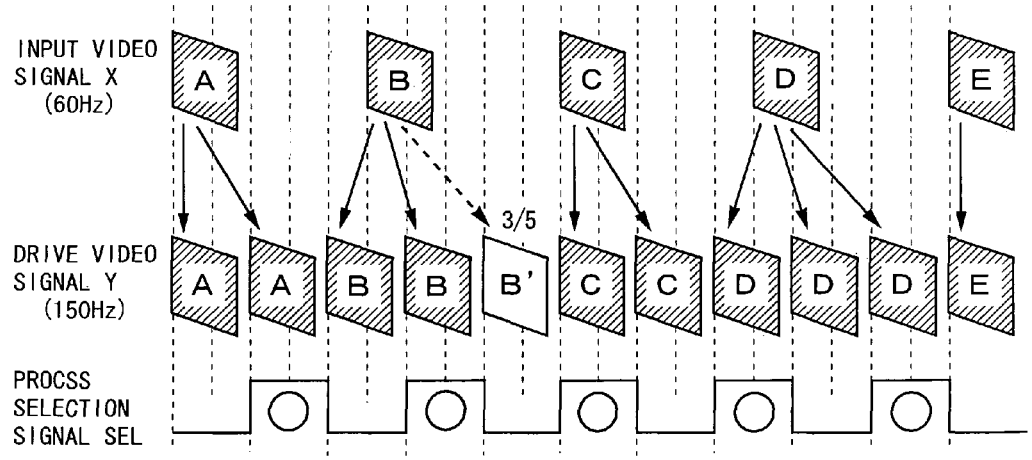
FIG. 11H is a diagram illustrating the same in the case of one interpolation frame.
Figure 11I:
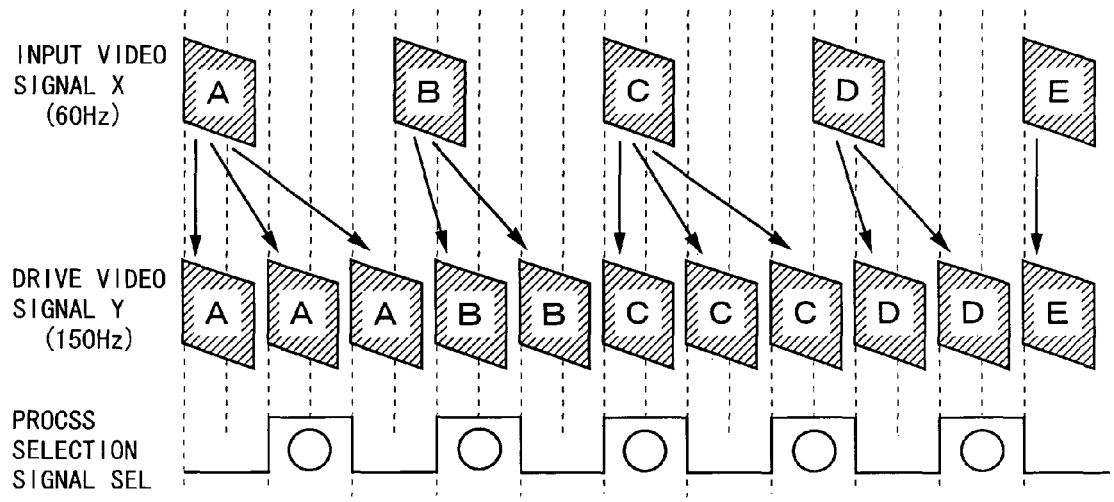
FIG. 11I is a diagram illustrating the same in the case of no interpolation frame.

As in the first embodiment, in the present embodiment also, the frame interpolation circuit 5 performs 2.5-times higher speed frame interpolation, and outputs five frames per input of two frames. It is assumed that in the present embodiment, the frame interpolation circuit 5 outputs ten frames per input of four frames. As shown in FIG. 10, when frames A, B, C, D, and E are inputted at intervals of 1/60 sec., the frame interpolation circuit 5 outputs the frames A, C, and E without modification, four frames F1 to F4 at intervals of 1/150 sec. between the frames A and C, and four frames F5 to F8 at intervals of 1/150 sec. between the frames C and E.

The frame interpolation circuit 5 outputs either original or interpolation frames as the frames F1 to F8. More specifically, the frame interpolation circuit 5 selectively outputs either original or interpolation frames as the frames F1 to F8 in accordance with the control signal S outputted from the motion determination circuit 8. When the control signal S has a value of "s" (where "s" is an integer from 0 to 8), the frame interpolation circuit 5 outputs "s" interpolation frames and "(8−s)" original frames as the frames F1 to F8.

As in the first embodiment, the interpolation frame is created using at least either a motion-compensated image for the previous frame or a motion-compensated image for the subsequent frame, based on the motion vector between the previous frame and the subsequent frame.

Described below is the case where the frame interpolation circuit 5 creates the interpolation frame using the motion-compensated image for the previous frame. FIGS. 11A to 11I are diagrams illustrating the details of the 2.5-times higher speed frame interpolation by the frame interpolation circuit 5. The frame interpolation circuit 5 performs any of nine operations shown in FIGS. 11A to 11I in accordance with the control signal S. Note that FIGS. 11A to 11I use the same notation as used in FIGS. 3A to 3E. Also, a process selection signal SEL is at low level during the first sub-frame and at high level during the second sub-frame, a circle represents outputting of the original frame during the second sub-frame, and a cross represents outputting of the interpolation frame during the second sub-frame.

When the control signal S has a value of 8 (see FIG. 11A), the frame interpolation circuit 5 sequentially outputs $A_{2/5}$, $A_{4/5}$, $B_{1/5}$, $B_{3/5}$, $C_{2/5}$, $C_{4/5}$, $D_{1/5}$, and $D_{3/5}$ as the frames F1 to F8. In this case, the frame interpolation circuit 5 outputs eight interpolation frames as the frames F1 to F8.

Similarly, when the control signal S has a value of 7 (FIG. 11B), $A_{2/5}$, $A_{4/5}$, $B_{1/5}$, $B_{3/5}$, $C_{2/5}$, D, $D_{1/5}$, and $D_{3/5}$ (one original frame and seven interpolation frames) are outputted. When the control signal S has a value of 6 (FIG. 11C), $A_{2/5}$, B, $B_{1/5}$, $B_{3/5}$, $C_{2/5}$, D, $D_{1/5}$, and $D_{3/5}$ (two original frames and six interpolation frames) are outputted. When the control signal S has a value of 5 (FIG. 11D), $A_{2/5}$, B, B, $B_{3/5}$, $C_{2/5}$, D, $D_{1/5}$, and $D_{3/5}$, (three original frames and five interpolation frames) are outputted. When the control signal S has a value of 4 (FIG. 11E), $A_{2/5}$, B. B. $B_{3/5}$, $C_{2/5}$, D, D, and $D_{3/5}$ (four original frames and four interpolation frames) are outputted. When the control signal S has a value of 3 (FIG. 11F), A, B, B, $B_{3/5}$, $C_{2/5}$, D, D, and $D_{3/5}$ (five original frames and three interpolation frames) are outputted. When the control signal S has a value of 2 (FIG. 11G), A, B, B, $B_{3/5}$, C, D, D, and $D_{3/5}$ (six original frames and two interpolation frames) are outputted. When the control signal S has a value of 1 (FIG. 11H), A, B, B, $B_{3/5}$, C, D, D, and D (seven original frames and one interpolation frame) are outputted. When the control signal S has a value of 0 (FIG. 11I), A, A, B, B, C, C, D, and D (eight original frames) are outputted.

In this manner, as in the first embodiment, in the present embodiment also, the frame interpolation circuit 5 changes the proportion between the original and interpolation frames contained in the drive video signal Y in accordance with the control signal S. In particular, the frame interpolation circuit 5 increases the proportion of interpolation frames contained in the drive video signal Y as motion in the image represented by the input video signal X increases, while increasing the proportion of original frames contained in the drive video signal Y as the motion in the image represented by the input video signal X decreases.

Accordingly, for the reason similar to that in the first embodiment, even when performing time-division gradation drive for preferentially redistributing brightness to one of two frames, the liquid crystal display device according to the present embodiment makes it possible to display the original and interpolation frames in a proportion suitable for the amount of motion in the image, thereby reducing any moving image blur due to following line of sight and noise generated in the interpolation frames.

Note that in the liquid crystal display device according to the present embodiment also, the frame interpolation circuit 5 may also perform frame interpolation other than those shown in FIGS. 11A to 11I. Concretely, so long as the temporal order of the original and interpolation frames contained in the drive video signal Y is correct, the frame interpolation circuit 5 may output the interpolation frame at any times, may use a motion vector multiplied by an arbitrary number to create the interpolation frame, or may create the interpolation frame using the motion-compensated image for the subsequent frame (or both the motion-compensated image for the previous frame and the motion-compensated image for the subsequent frame).

Figure 12:
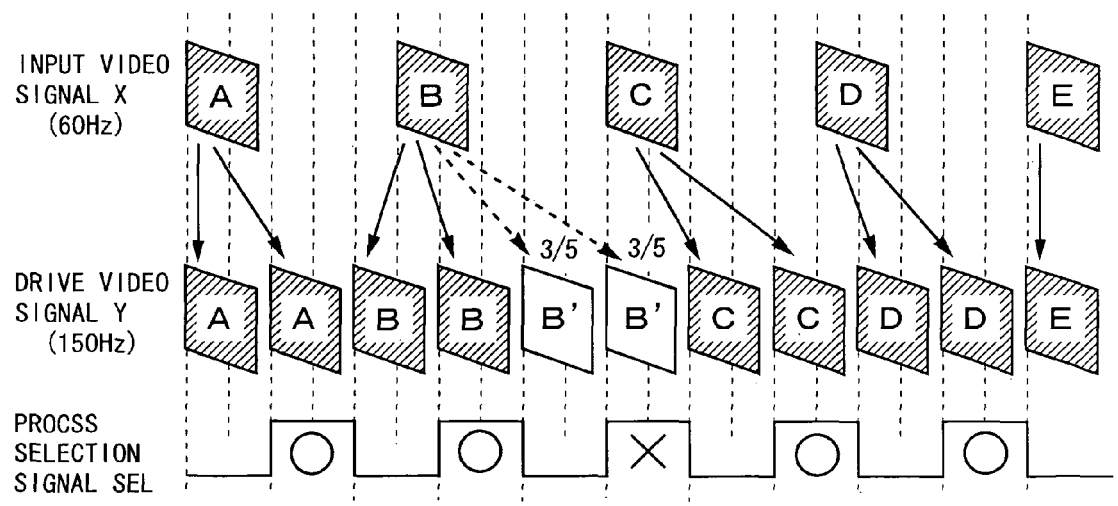
FIG. 12 is a diagram illustrating (the first example of) other exemplary 2.5-times higher speed frame interpolation by the liquid crystal display device according to the second embodiment.

For example, when the control signal S has a value of 2, the frame interpolation circuit 5 may sequentially output A, B, B, $B_{3/5}$, $B_{3/5}$, C, C, D, and D (two original frames and six interpolation frames) as the frames F1 to F8, as shown in FIG. 12. In this manner, by outputting the same frame twice, it also becomes possible to drive the liquid crystal display elements 9 at a frame rate of substantially 75 Hz.

Also, in the liquid crystal display device according to the present embodiment, so long as the temporal order of the original and interpolation frames contained in the drive video signal Y is correct, the frame interpolation circuit 5 may output the original or interpolation frame as either the first or second sub-frame. Therefore, of the original and interpolation frames, the frame interpolation circuit 5 can also preferentially assign the original frame to the second sub-frame.

Figure 13A:
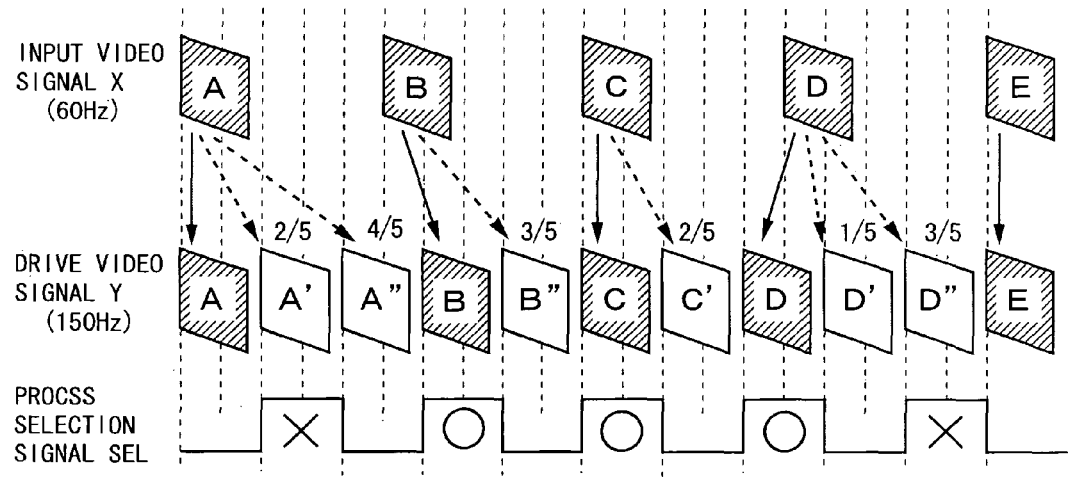
FIG. 13A is a diagram illustrating the second example of the same.
Figure 13B:
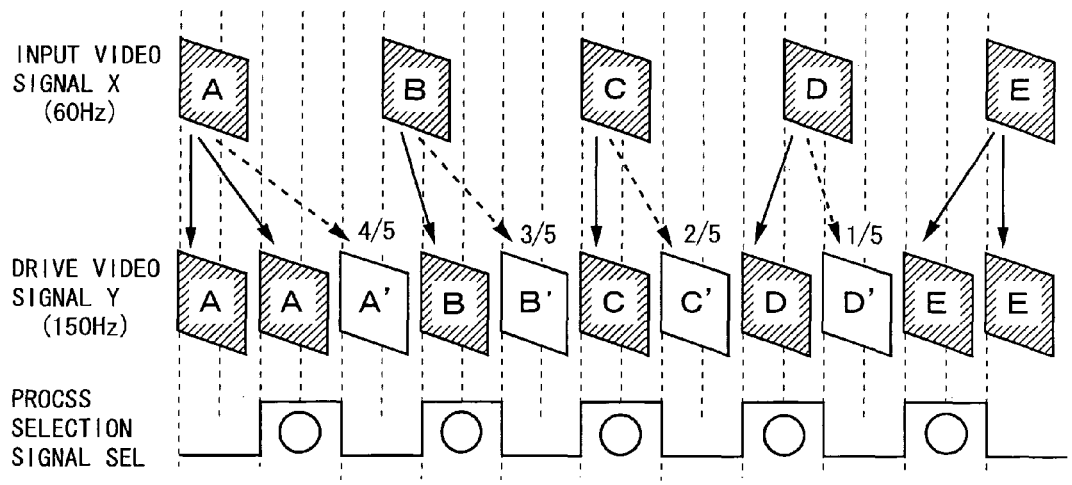
FIG. 13B is a diagram illustrating the third example of the same.

For example, when the control signal S has a value of 6, the frame interpolation circuit 5 may sequentially output $A_{2/5}$, $A_{4/5}$, B, $B_{3/5}$, $C_{2/5}$, D, $D_{1/5}$, and $D_{3/5}$ (two original frames and six interpolation frames) as the frames F1 to F8, as shown in FIG. 13A, and when the control signal S has a value of 4, it may sequentially output A, $A_{4/5}$, B, $B_{3/5}$, $C_{2/5}$, D, $D_{1/5}$, and E (four original frames and four interpolation frames) as the frames F1 to F8, as shown in FIG. 13B.

In this manner, by preferentially assigning the original frame to any frame to which brightness is preferentially distributed, it becomes possible to reduce noise generated in the frame to which brightness is preferentially distributed. As a result, in the image display device performing time-division gradation drive, it is possible to further reduce noise generated in the interpolation frames. However, in the present embodiment also, to effectively suppress occurrence of any moving image blur, when outputting the original frame in place of the interpolation frame, it is preferable to output the original frame at the closest possible times compared to the case of ideally outputting the interpolation frame.

Also, the liquid crystal display device according to the present embodiment has been described as performing time-division gradation drive for preferentially redistributing brightness to one of two frames, but it may perform time-division gradation drive for redistributing brightness to one of three or more frames in accordance with a predetermined priority order. This liquid crystal display device also achieves effects similar to those achieved by the liquid crystal display device according to the present embodiment.

Note that the liquid crystal display devices according to the first and second embodiments have been described as including the motion detection circuit 2 for performing motion detection on the input video signal X, but the motion detection circuit may be provided outside the liquid crystal display device. For example, when the input video signal X is obtained by decoding an MPEG bitstream, a motion vector obtained through the decoding may be provided to the liquid crystal display device as a motion detection result for the input video signal. In addition, the liquid crystal display device has so far been described as an example of the image display device, but the present invention is also applicable to any image display device such as an electroluminescence display device.

Industrial Applicability

The image display device of the present invention is capable of reducing any moving image blur due to following line of sight and noise generated in the interpolation frames, and therefore can be used as any of various image display devices, such as a liquid crystal display device or an electroluminescence display device.

The invention claimed is:

1. An image display device for displaying a screen based on a video signal subjected to frame interpolation, comprising:
   a plurality of display elements;
   a drive circuit to drive the display elements;
   a frame interpolation circuit to perform frame interpolation on an input video signal, and outputting a drive video signal containing original and interpolation frames to the drive circuit; and
   a motion determination circuit to output a control signal in accordance with an amount of motion blur, based on a motion detection result for the input video signal, wherein,
   the frame interpolation circuit changes a proportion between the original and interpolation frames contained in the drive video signal in accordance with the control signal such that the proportion of the interpolation frames in the drive video signal varies directly with the amount of motion blur in the input video signal.

2. The image display device according to claim 1, wherein the frame interpolation circuit increases the proportion of interpolation frames contained in the drive video signal as motion in an image represented by the input video signal increases, while increasing the proportion of original frames contained in the drive video signal as the motion in the image represented by the input video signal decreases.

3. The image display device according to claim 1, wherein the frame interpolation circuit performs frame interpolation on the input video signal based on the motion detection result for the input video signal.

4. The image display device according to claim 3, wherein the frame interpolation circuit obtains the interpolation frame based on the motion detection result for the input video signal using at least either a motion-compensated image for a previous frame or a motion-compensated image for a subsequent frame.

5. The image display device according to claim 1, further comprising a motion detection circuit for performing motion detection on the input video signal.

6. The image display device according to claim 5, wherein the motion detection circuit performs motion detection on the input video signal through a block-by-block matching process.

7. The image display device according to claim 5, wherein the motion detection circuit performs motion detection on the input video signal through a pixel-by pixel matching process.

8. The image display device according to claim 1, wherein the drive circuit subjects the drive video signal to gradation conversion for redistributing brightness in accordance with a prioritized order among a plurality of frames, and uses a resultant video signal to drive the display elements.

9. The image display device according to claim 8, wherein the drive circuit alternately subjects the drive video signal on a frame-by-frame basis to first gradation conversion for non-preferential brightness distribution and second gradation conversion for preferential brightness distribution, and uses a resultant video signal to drive the display elements.

10. The image display device according to claim 8, wherein, of the original and interpolation frames, the frame interpolation circuit preferentially assigns the original frame to any frame to which brightness is preferentially distributed by the drive circuit.

11. The image display device according to claim 1, wherein the drive video signal has a frame rate greater than the frame rate of the input video signal.

* * * * *